Feb. 7, 1961 R. A. PALMER 2,971,077
ELECTRIC HEATER
Filed June 9, 1959
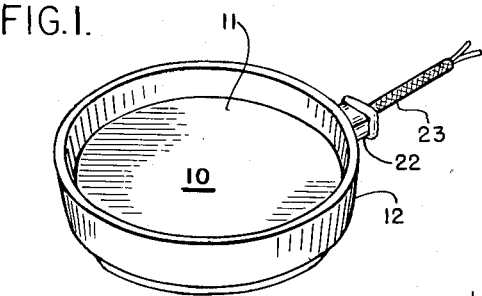
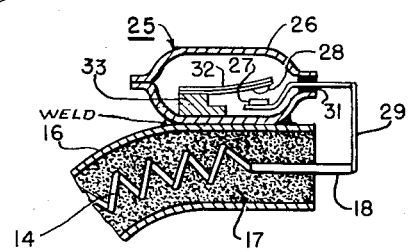
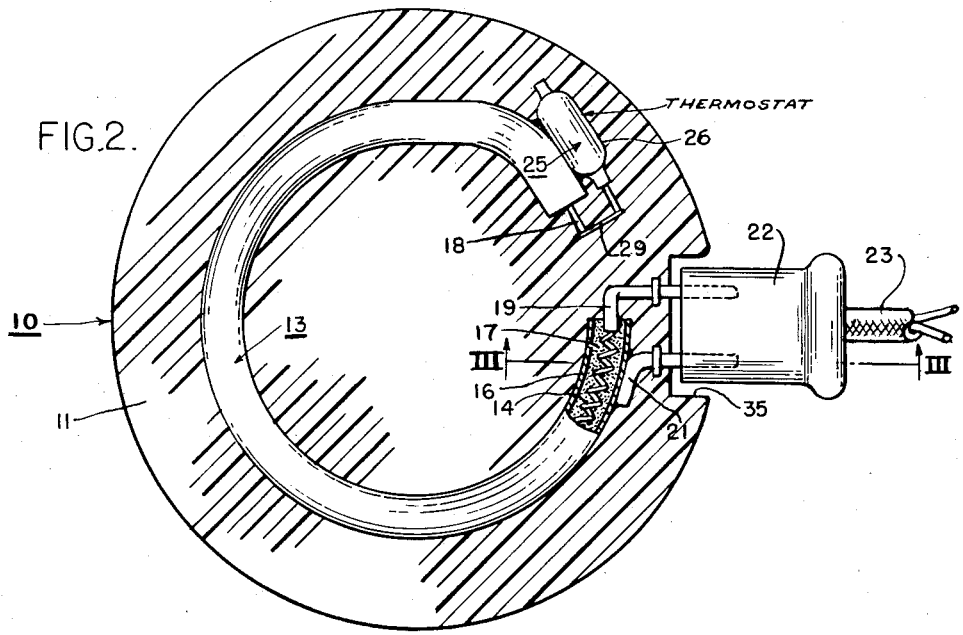
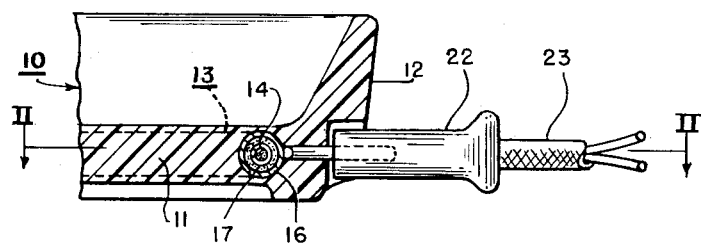
INVENTOR
REED A. PALMER
BY Ralph T. French
ATTORNEY.

United States Patent Office 2,971,077
Patented Feb. 7, 1961

2,971,077

ELECTRIC HEATER

Reed A. Palmer, Mansfield, Ohio, assignor to Westinghouse Electric Corporation, East Pittsburgh, Pa., a corporation of Pennsylvania Filed June 9, 1959, Ser. No. 819,032

3 Claims. (Cl. 219—44)

This invention relates to electric heaters, particularly to electric heaters for articles of plastic or other non-electrically conductive material, and to such electrically heated articles, and has for an object to facilitate control of the electrical heating of articles constructed of such materials.

Another object of the invention is to facilitate the control of electrical sheathed heaters molded or cast in plastic or like non-electrically conductive material.

In accordance with the present invention, an article of plastic or other non-electrically conductive material, capable of standing only low or moderate temperatures, for example, a serving dish for keeping food hot on a dining table, has molded or cast into its body an electric heater of the sheathed type and a thermostat for controlling the supply of electrical current thereto to limit the temperature thereof to a value which may be safely withstood by the material of the article.

The sheathed heater in itself is of conventional construction, comprising a helical electrical heating element housed in a tubular sheath and spaced therefrom and electrically insulated with respect thereto by compacted refractory material, as is well understood in the art. Terminal pins are associated with the two ends of the electrical heating element and project outwardly beyond the corresponding ends of the sheath.

A thermostat is associated with one terminal portion of the sheathed heater and includes a casing welded, or otherwise suitably secured, to the heater terminal portion in a manner to provide for both good heat transfer and electrical contact between the sheath and the thermostat casing. The thermostat within the casing includes a pair of contacts movable into and out of engagement with each other, one contact being connected to the adjacent terminal pin of the electrical heating element by means which is insulated from the thermostat casing. The other contact of the thermostat is carried by a bimetallic arm mounted on an inner wall of the casing in a position to be subjected to temperature changes in the heater.

The bimetallic arm and its contact are so constructed and positioned within the casing and with respect to the other contact that, when the heater and the bimetallic arm are relatively cool, the contacts are in engagement to close a circuit from the electric heating element terminal pin, through the contacts and bimetallic arm, to the heater sheath to which the thermostat casing is secured. When the heater reaches a predetermined maximum safe temperature, the contacts are separated as a result of deflection of the bimetallic arm and the circuit thereby interrupted to terminate flow of current to the electrical heating element, until such time as the heater and thermostat have cooled sufficiently.

At the other end of the sheathed heater, the sheath is provided with a terminal pin disposed in parallel spaced and side-by-side relation with respect to the adjacent terminal pin of the electrical heating element, these two terminal pins being adapted for reception in the usual appliance cord plug for connecting the device with a suitable source of electrical power.

The entire heater and thermostat assembly are molded or cast into the material of the article to be heated, with only the last-mentioned terminal pins projecting therefrom. Thus, the heater and its thermostat are completely protected from damage and from handling, with the result that the device is safe to handle as far as shock hazard is concerned, while at the same time the article may be completely immersed in water for cleansing. Furthermore, with all parts of the heater and its thermostatic control completely covered by the molding of plastic or like material, an article of unusually pleasing appearance may be produced.

With articles formed of plastic or similar material, it is important to have the thermostatic control positioned close to the heater for accurate control thereof, since materials of a plastic or similar nature are usually limited in the degree of temperature they can withstand without damage.

The above and other objects are effected by the invention as will be apparent from the following description taken in connection with the accompanying drawings, forming a part of this application, in which:

Fig. 1 is a perspective view of a serving dish incorporating the present invention;

Fig. 2 is a horizontal sectional view, taken along the line II—II of Fig. 3, looking in the direction indicated by the arrows;

Fig. 3 is a transverse sectional view, taken along the line III—III of Fig. 2, looking in the direction indicated by the arrows; and Fig. 4 is an enlarged fragmentary horizontal sectional view through a terminal portion of the heater and through the thermostatic control associated therewith.

Referring now to the drawings in greater detail, there is shown, at 10, a vessel or dish suitable for serving hot foods on a dining table and comprising a bottom wall 11 and supporting side walls 12 of plastic or other known electrically conductive material. As shown in Figs. 2 and 3, a heater 13 of the sheathed type is molded or cast into the bottom wall 11 of the vessel, the heater comprising a helical electrical heating element 14 surrounded, in spaced relation, by a tubular sheath 16, the space between the heating element and the sheath being filled with compacted refractory material 17, which not only serves to retain the helical heating element 14 spaced from the sheath 16, but also electrically insulates the heating element from the sheath. The heating element is provided at its ends with terminal pins 18 and 19. The terminal portion of the sheath 16 which is adjacent the terminal pin 19 has welded, or otherwise secured thereto, a terminal pin 21 disposed in parallel spaced side-by-side relation to the terminal pin 19. These pins 19 and 21 may be referred to as service pins since they provide the connection between the article and the usual electrical service line. The two free ends of these service terminal pins 19 and 21 are adapted to be received in mating recesses in the usual electrical plug 22, carried at one end of a conventional appliance cord 23, by which the vessel may be connected with a suitable source of electrical power.

Referring to Fig. 2, it will be seen that the other terminal portion of the sheath 16, adjacent the terminal pin 18, carries a capsule type thermostat 25. A casing 26 for the thermostat 25 is welded, or otherwise suitably secured, to the sheath 16. Preferably, the securement is over a relatively wide area of the thermostat casing 26 in order to provide for good heat transfer from the sheath to the casing. The connection also provides an electrical path between the sheath and the casing.

The thermostat includes a pair of contacts 27 and 28, the contact 27 being connected by a wire 29 with the terminal pin 18 of the electrical heating element 14. This wire 29 is insulated from the thermostat casing 26 by suitable insulation, as at 31, where the wire passes through the casing 26. The other contact 28 is movably supported relative to the contact 27 by a thermomotive element in the form of a bimetallic arm 32, mounted at one end by support 33 to the inner wall of the thermostat casing 26, in the region of its jointure to the sheath 16. The support 33 is electrically conductive, with the result that the bimetallic arm 32 is electrically connected to the sheath.

The bimetallic arm 32 is so constructed and arranged that when the heater and thermostat are relatively cool, the contacts 27 and 28 will be in engagement, thereby providing an electrical circuit from the electrical heating element 14, through the terminal pin 18, wire 29, contact 27, contact 28, bimetallic arm 32, support 33, and thermostat casing 26, to the sheath 16. As previously indicated, the other ends of the electrical heating element 14 and of the sheath 16 are adapted to be connected to a source of power, with the result that, with the contacts 27 and 28 in engagement of the plug 22 engaged with the terminal pins 19 and 21, current will flow through the electrical heating element to energize the heater.

As the temperature of the heater and of the thermostat 25 associated therewith increases to a predetermined degree, which is below the safe temperature limit for the particular material of which the vessel 10 is formed, the contacts 27 and 28 will separate, due to deflection of the bimetal 32, thereby interrupting the electrical circuit to the heating element and permitting the latter to cool until such time as the bimetallic arm 32 returns to contact closing position, whereupon the circuit will be reestablished and heating again effected.

As best shown in Fig. 2, the entire heater 13 and its associated thermostat 25 are completely embedded in the material of the vessel, with only the free ends of the terminal pins 19 and 21 projecting beyond the outer surface of the vessel. Therefore, it will be apparent that the vessel may be completely immersed in water for cleaning without the possibility of any damage to either the heater or its thermostat, and that a very pleasing appearance may be effected. To this end, the wall of the vessel may, if desired, be recessed as shown at 35 in Fig. 2, and the terminal pins provided in the recess so that their projection beyond the normal surface of the vessel is held to a minimum.

While the invention has been shown in but one form, it will be obvious to those skilled in the art that it is not so limited, but is susceptible of various changes and modifications without departing from the spirit thereof.

What is claimed is:

1. An electrically heated container of plastic or like non-electrically conductive material, an electrical heater therefor including a tubular sheath of electrically conductive material and an electrical heating element housed therein and electrically insulated therefrom, a pair of service terminals for connecting said sheath and said element in series in an electrical circuit, a thermostat in series with said sheath and said element and disposed in good heat transfer relation to the heater and responsive to changes in temperature thereof, said thermostat opening said circuit when said heater reaches a predetermined high temperature which is below the maximum safe temperature for the material of the container, said heater and thermostat being completely encased in the material of said container except for the service terminals.

2. An electrically heated container of plastic or like non-electrically conductive material, a sheathed heater including a tubular sheath of electrically conductive material and an electrical heating element housed therein and electrically insulated therefrom, a pair of spaced parallel service terminals for said heater, one of said terminals being electrically connected to one terminal portion of the sheath and the other terminal being electrically connected to the corresponding end of said electrical heating element, and means including a thermostat providing an electrical circuit between the other terminal portion of the sheath and the corresponding end of the electrical heating element, said thermostat being disposed in contact with the tubular sheath so as to be responsive to changes in temperature of said sheathed heater and functioning to limit the maximum temperature thereof to a value below the maximum safe temperature for the material of the container, said sheath, said electrical heating element and said thermostat being completely encased in the material of said container.

3. In an electric heater for an article of non-electrically conductive material, a tubular sheath of electrically conductive material, an electrical resistance heating element housed in, and spaced from, said sheath, refractory material filling the space between said heating element and the sheath, terminal pins electrically connected to the terminal portions of said heating element and extending beyond the ends of the sheath, a thermostat casing secured to one terminal portion of the sheath in good thermal and electrical transmitting relation thereto, a pair of electrical contacts housed in said casing, means electrically connecting one of said contacts with the terminal pin of said one terminal portion of the sheath, said means being electrically insulated from the thermostat casing, a thermomotive element electrically connected to said casing and supporting the other of said contacts for movement into and out of engagement with said one contact, said thermomotive means being so constructed and arranged that when it is cool the contacts are engaged to establish an electrical circuit from the electrical resistance heating element to the sheath through the thermostat and when it is heated to a predetermined temperature the contacts are separated to interrupt said circuit, and a terminal pin electrically connected to the other terminal portion of the sheath and disposed in parallel spaced side-by-side relation to the heating element terminal pin at said other terminal portion of the sheath.

References Cited in the file of this patent

UNITED STATES PATENTS

| | | |
|---|---|---|
| 1,257,599 | Hadaway | Feb. 26, 1918 |
| 1,581,429 | Dunle | Apr. 20, 1926 |
| 2,164,813 | Gunther | July 4, 1939 |
| 2,456,030 | Sohns | Dec. 14, 1948 |
| 2,527,864 | Weidenschilling | Oct. 31, 1950 |
| 2,735,923 | Juvinall et al. | Feb. 21, 1956 |